United States Patent [19]

Yokote

[11] Patent Number: 4,623,168

[45] Date of Patent: Nov. 18, 1986

[54] AUTOMATIC SEAT BELT SYSTEM

[75] Inventor: Yoshihiro Yokote, Yokohama, Japan

[73] Assignee: NSK-Warner K.K., Japan

[21] Appl. No.: 663,157

[22] Filed: Oct. 22, 1984

[30] Foreign Application Priority Data

Nov. 2, 1983 [JP] Japan .......................... 58-170346[U]

[51] Int. Cl.$^4$ ............................................. B60R 21/10
[52] U.S. Cl. .................................................. 280/804
[58] Field of Search ............... 280/804, 801, 802, 807, 280/803, 808; 297/469, 483

[56] References Cited

U.S. PATENT DOCUMENTS

| 4,274,658 | 6/1981 | Takata ................................. 280/804 |
| 4,313,622 | 2/1982 | Suzuki et al. ....................... 280/804 |
| 4,498,690 | 2/1985 | Takada ................................. 280/804 |

FOREIGN PATENT DOCUMENTS

2915053A1  10/1980  Fed. Rep. of Germany.

Primary Examiner—Richard A. Bertsch
Attorney, Agent, or Firm—Wegner & Bretschneider

[57] ABSTRACT

An automatic seat belt system makes use of a drive member, for example, a drive tape for causing a runner to move back and forth along a guide rail mounted from the side roof to the center pillar within the room of an automobile. The drive tape is formed of a stretched tape made of a polyamide resin such as nylon 11 or nylon 12. The drive tape requires a low material cost and exhibits superb resistance to tensile and compression forces. The former advantage enables to reduce the overall manufacturing cost of the automatic seat belt system. On the other hand, the latter advantage permits use of a narrower and thinner drive tape, whereby permitting an overall size reduction to the automatic seat belt system. Owing to the possibility of using such a narrow drive tape, the drive tape can be arranged in a state bent in its widthwise direction without increasing its sliding resistance to any substantial degree.

4 Claims, 2 Drawing Figures

4,623,168

AUTOMATIC SEAT BELT SYSTEM

BACKGROUND OF THE INVENTION

1. Field of the Invention

This invention relates to an automatic seat belt system, and especially to an improvement to the drive member of such an automatic seat belt system.

2. Description of the Prior Art

In an automatic seat belt system, a runner on which one portion of a webbing is fastened is displaceable along a guide rail arranged along the body of an automobile while being guided by the same guide rail. The runner is driven by a drive means for example in association with the opening or closure of a door so that the runner moves along the guide rail to render the webbing displaceable between an occupant restraining position and an occupant non-restraining position. As such drive members, drive tapes made of synthetic resins, such as those described in U.S. Pat. No. 4,313,622 issued Feb. 2, 1982 to Ichiro Suzuki et al, have found widespread commercial utility because inter alia they may be fabricated at lower costs and they produce less noise upon their operations compared with conventional wires, for example, those disclosed in U.S. Pat. No. 4,274,658 issued June 23, 1981 to Juichiro Takata. As materials for such drive tapes, polyester-base resins have conventionally been used as described for example in German Offlenlegungsschrift No. 22 15 053 assigned to Metallwerk Max Brose GmbH & Co. and laid-open to the public on Oct. 23, 1980. However, drive tapes made of such polyester-base resins require high fabrication costs. In addition, the resistance of such drive tapes are not very strong against tensile or compression forces. Therefore, it is indispensable to make the widths and thicknesses of such drive tapes greater. Such drive tapes are hence accompanied by such inherent drawbacks that their guide rails, namely, the seat belt systems become larger correspondingly and due to their large widthwise dimensions, their sliding resistance increases to considerable extents when the drive tapes are arranged along the bodies of their respective automobiles in such a way that they are bent in widthwise directions.

SUMMARY OF THE INVENTION

An object of this invention is to solve the problems or inconvenience of the above-described prior art automatic seat belt systems.

It has been surprisingly found that the above object can be achieved by using a drive member made of a polyamide-base resin, which is economical in material cost and excellent in strength, in place of a conventional drive member made of a polyester.

In one aspect of this invention, there is thus provided an automatic seat belt system including a guide rail arranged along a predetermined path within the room of an automobile, a runner provided movably on the guide rail, and a drive member for causing the runner to move, while being guided by the guide rail, in such a way that a webbing fastened to the runner is displaceable between an occupant restraining position and an occupant non-restraining position, wherein the drive member is formed of a stretched or drawn, polyamide tape made of a polyamide resin. It is well-known that the stretching, or drawing, process results in orientation of the polyamide crystals. This results in particularly good tensile strength properties.

The drive member of the automatic seat belt system of this invention requires a low material cost and exhibits superb resistance to tensile and compression forces. The former advantage enables to reduce the overall manufacturing cost of the automatic seat belt system. On the other hand, the latter advantage permits use of a narrower and thinner drive member, e.g., drive tape, whereby permitting an overall size reduction to the automatic seat belt system. Owing to the possibility of using such a narrow drive tape, the drive tape can be arranged in a state bent in its widthwise direction without increasing its sliding resistance to any substantial degree.

The above and other objects, features and advantages of the present invention will become apparent from the following description and appended claims, taken in conjuction with the accompanying drawings.

DETAILED DESCRIPTION OF THE INVENTION AND PREFERRED EMBODIMENT

Figure 1:
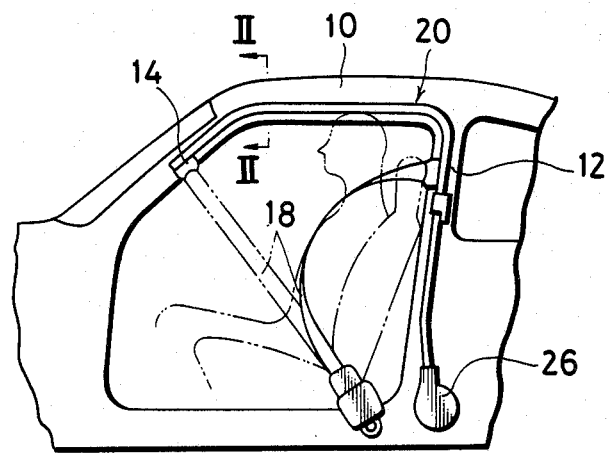
FIG. 1 is a simplified schematic illustration of an automatic seat belt system according to one embodiment of this invention.
Figure 2:
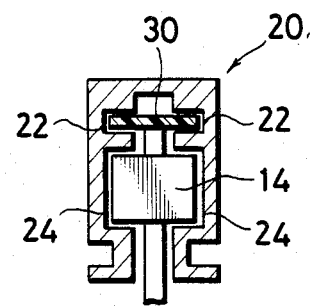
FIG. 2 is a cross-sectional view taken along line II—II of FIG. 1.

As shown in FIG. 1, a guide rail 20 having such a cross-sectional shape as depicted in FIG. 2 is arranged from a side roof 10 to a center pillar 12 within the room of an automobile. The guide rail 20 defines guide channels 22 for a drive tape 30 and another guide channel 24 for a runner 14. One end of a webbing 18 is fastened on the runner 14. The forward end of the drive tape 30 is also connected to the runner 14.

The drive tape 30 has been formed by stretching, or drawing a polyamide-base resin, preferably, nylon 11 or nylon 12 and extends like a belt having a flattened rectangular cross-section. A lower part of the drive tape 30, which includes a lower end portion of the drive tape 30, is releasably received within a vortical receiving channel formed in a drum (not shown) mounted fixedly on the motor shaft (un-illustrated) of a motor 26, and the lower end portion of the drive tape 30 is fixed on the drum. Accordingly, the drive tape 30, namely, the runner 14 is displaced back and forth and the webbing 18 is hence displaced between an occupant restraining position and an occupant non-restraining position, when the motor 26 turns in both directions.

In the present embodiment, the drive tape 30 which has been obtained by stretching a polyamide-base resin is employed in place of a conventional drive tape made of a polyester. The drive tape 30 has made it possible to reduce the material cost (to almost one half) and at the same time to improve the strength (both compression strength and tensile strength). The tensile strength of a conventional drive tape made of a polyester was for example 20 kgf/mm$^2$. This tensile strength has been improved to 35–40 kgf/mm$^2$ in the present example. The reduced material cost of the drive tape 30 contributes to the overall cost reduction of a seat belt system. Owing to the improved strength of the drive tape 30, it has become possible to reduce the width of the drive tape 30 while still maintaining the same level of strength as conventional polyester-made drive tapes. Reflecting such a narrower width of the drive tape 30, the guide rail 20 can be formed with a narrower width (for example, to a width about 30% narrower than conventional polyester-made drive tapes). As a result, the manufacturing costs of the drive tape 30 and guide rail 20 have been lowered. Owing to the narrower width, the extent of projection of the guide rail 20 has been reduced and the weight of the guide rail 20 has also been lowered. Furthermore, the narrower width of the drive tape 30 means that it has become easier to bend the drive tape 30 in its widthwise direction. This has improved the drawback of a tape-like drive member that its frictional resistance is increased considerably when arranged in a state bent in its widthwise direction, thereby enhancing the flexibility of the guide rail 20 as to its arrangement path.

It should be borne in mind that the present invention is not necessarily limited to or by the above Example. It may thus be changed or modified suitably without departing from the spirit or scope of this invention.

For example, the material of the drive tape 30 may be any polyamide-base resin other than nylon 11 or nylon 12. Its cross-sectional shape may for example be circular instead of the above-illustrated rectangular cross-section, so that the resulting drive member may be employed as a rod-like drive member. In this case, it is obviously necessary to form each of the drive member guide channels of the guide rail 20 into a semi-circular shapes in transverse cross-section. Besides, it is also feasible to effect some other changes or modifications, including changes to the arrangement path of the guide rail 20 and to the constitution of the webbing 18.

Having now fully described the invention, it will be apparent to one of ordinary skill in the art that many changes and modifications can be made thereto without departing from the spirit or scope of the invention as set forth herein.

What is claimed is:

1. In an automatic seat belt system including a guide rail to be arranged along a predetermined path within the room of an automobile, a runner provided movably on the guide rail, and a drive member for causing the runner to move, while being guided by the guide rail, in such a way that a webbing fastened to the runner is displaceable between an occupant restraining position and an occupant non-restraining position, the improvement wherein the drive member is formed of an oriented polyamide tape made of a polyamide resin.

2. An automatic seat belt system as claimed in claim 1, wherein the polyamide resin is nylon 11.

3. An automatic seat belt system as claimed in claim 1, wherein the polyamide resin is nylon 12.

4. An automatic seat belt system as claimed in claim 1, wherein the oriented polyamide tape has a tensile strength of 35–40 $kgf/mm^2$.

* * * * *